(12) United States Patent
Sugahara

(10) Patent No.: US 6,425,080 B1
(45) Date of Patent: Jul. 23, 2002

(54) ASYNCHRONOUS TRANSFER MODE (ATM) CELL DESCRAMBLING CIRCUIT

(75) Inventor: Eiichi Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 41 days.

(21) Appl. No.: 09/124,764

(22) Filed: Jul. 29, 1998

(30) Foreign Application Priority Data

Aug. 5, 1997 (JP) ............................................... 9-210477

(51) Int. Cl.⁷ ................................................ G06F 1/26
(52) U.S. Cl. ..................................... 713/154; 713/160
(58) Field of Search .................................. 713/154, 160

(56) References Cited

U.S. PATENT DOCUMENTS

| | | | | |
|---|---|---|---|---|
| 5,161,193 A | * | 11/1992 | Lampson et al. | 713/151 |
| 5,444,782 A | * | 8/1995 | Adams, Jr. et al. | 713/153 |
| 5,594,869 A | * | 1/1997 | Hawe et al. | 713/201 |
| 5,642,421 A | * | 6/1997 | Gray et al. | 713/160 |

FOREIGN PATENT DOCUMENTS

| | | |
|---|---|---|
| EP | 0 714 186 A2 | 5/1996 |
| EP | 0 717 411 A2 | 6/1996 |
| JP | 5-95366 | 4/1993 |
| JP | 9-83391 | 3/1997 |

OTHER PUBLICATIONS

"Self–synchronizing Scambler", ANSI T1. 646–1995 11.3, pp. 26–27.
Japanese Office Action dated Mar. 4, 1999, with partial translation.
German Office Action dated Oct. 27, 1999, with English translation.

* cited by examiner

Primary Examiner—Thomas R. Peeso
(74) Attorney, Agent, or Firm—McGinn & Gibb, PLLC

(57) ABSTRACT

An ATM cell descrambling circuit for detecting a header portion and a payload portion of each cell of a scrambled asynchronous transfer mode (ATM) cell sequence in the state that each cell pre- or fully-synchronizes, descrambling the payload portion, and outputting a descrambled ATM cell sequence is disclosed, that comprises a means for determining whether each ATM cell is an unnecessary ATM cell that is not used in a higher layer of an ATM communication so as to stop a cell descrambling operation for a predetermined period.

11 Claims, 7 Drawing Sheets

ASYNCHRONOUS TRANSFER MODE (ATM) CELL DESCRAMBLING CIRCUIT

BACKGROUND OF THE INVENTION

1. Field of the Invention

The present invention relates to a descrambling circuit, in particular, to a descrambling circuit for an ATM (Asynchronous Transfer Mode) cell.

2. Description of the Related Art

In a conventional ATM transmission system, an ATM cell scrambling circuit is used so as a receiving terminal to synchronize a sequential cell as a cell synchronization, and scrambled information is descrambled by an ATM cell descrambling circuit that accords with a standard such as "Self-synchronizing scrambler", ANSI T1. 646-1995 11.3. FIG. 5 shows the structure of a cell descrambling circuit block. With reference to FIG. 5, the operation of the cell descrambling circuit block 1 will be described. Referring to FIG. 5, a scrambled ATM cell sequence 101 and a cell header signal 103 that synchronizes with the ATM cell sequence 101 and that is extracted by a cell synchronizing circuit (not shown) are input to a cell descrambling circuit 2. When a cell synchronizing condition of the scrambled ATM cells is synchronized fully or is pre-synchronized, the cell descrambling circuit 2 descrambles the scrambled ATM cell sequence 101 except for timing data thereof represented by the cell header signal 103 corresponding to self-synchronizing scrambling method using generating polynomial $X^{43}+1$. The cell descrambling circuit 2 outputs the result as a descrambled ATM cell sequence 102. A self-synchronizing scrambler "multiplies input data by the term of the maximum degree of a generating polynomial and divides the result by the generating polynomial". In other words, the cell scrambler multiplies input data by $X^{43}$ and then divides the result by $X^{43}+1$. Thus, the cell scrambler outputs a 48-byte scrambled result.

FIG. 6 shows the structure of the cell descrambling circuit 2. A descrambled ATM cell sequence 101 is sent to a 43-staged shift register 21. When a disable signal 103 is inactive, the 43-staged shift register 21 shifts the scrambled ATM cell sequence 101. When the disable signal 103 is active, the 43-staged shift register 21 does not shift the scrambled ATM cell sequence 101. The 43-staged shift register 21 delays the scrambled ATM cell sequence 101 in 43 stages. When the disable signal 103 is inactive, an adding circuit 22 outputs the added results of the delayed data in 43-staged shift register 21 and the scrambled ATM cell sequence 101. When the disable signal 103 is active, the adding circuit 22 outputs the scrambled ATM cell sequence.

FIG. 7 shows the relation between a scrambled ATM cell sequence and a descrambling operation performed by a conventional descrambling circuit. Referring to FIG. 7, each ATM cell is composed of a header portion (5 bytes) and a payload portion (48 bytes). Thus, the length of each ATM cell is 53 bytes. The ATM cell sequence contains necessary ATM cells that are used in a higher layer and unnecessary ATM cells such as idle cells (blank cells) and unassigned cells. The cell descrambling circuit descrambles only the payload portion (other than the header portions) of each ATM cell of the scrambled ATM cell sequence regardless of whether the ATM cell is necessary or unnecessary. The cell descrambling circuit outputs the descrambled ATM cell sequence by descrambling the cell scrambled ATM cell sequence.

The conventional ATM cell descrambling circuit descrambles all scrambled ATM cells. Thus, the conventional ATM cell descrambling circuit descrambles unnecessary ATM cells that are not used in a higher layer (such as idle cells and unassigned cells). Consequently, since the descrambling operation is performed for unnecessary ATM cells, the power consumption of the circuit is increased.

SUMMARY OF THE INVENTION

The present invention made from the above-described point of view. An object of the present invention is to provide a cell descrambling circuit that stops a cell descrambling operation for unnecessary ATM cells such as idle cells and unassigned cells that are not used in a higher layer for a predetermined period so that necessary ATM cells are normally descrambled and thereby the power consumption of the circuit is decreased.

A first aspect of the present invention is an ATM cell descrambling circuit for detecting a header portion and a payload portion of each cell of a scrambled ATM cell sequence in the state that each cell pre- or fully-synchronizes, descrambling the payload portion, and outputting a descrambled ATM cell sequence, the circuit comprising a means for -determining whether each ATM cell is an unnecessary ATM cell that is not used in a higher layer of an ATM communication so as to stop a cell descrambling operation for a predetermined period.

The predetermined period is a period just after the header portion of an unnecessary ATM cell until the beginning of data necessary for the normal ATM cell descrambling operation for the next ATM cell.

When unnecessary ATM cells successively take place, the predetermined period is a period just after the header portion of the first unnecessary ATM cell until the beginning of data necessary for the normal ATM cell descrambling operation for a necessary ATM cell just preceded by the last unnecessary ATM cell.

A second aspect of the present invention is an ATM cell descrambling circuit for detecting a header portion and a payload portion of each cell of a scrambled ATM cell sequence in the state that each cell pre- or fully-synchronizes, descrambling the payload portion, and outputting a descrambled ATM cell sequence, the circuit comprising a cell header pattern extracting means for inputting the scrambled ATM cell sequence and a cell header signal, a unnecessary cell detecting means for inputting a cell header pattern extracted by the cell header pattern extracting means and outputting an unnecessary cell detection signal, an unnecessary cell timing assigning means for inputting the cell header signal and the scrambled ATM cell sequence and outputting a cell descrambler disable signal and a cell scrambler input data corresponding to the unnecessary cell detection signal, and a cell descrambler circuit for descrambling the cell descrambler input data corresponding to the cell descrambler disable signal.

According to the present invention, unnecessary ATM cells such as idle cells and unassigned cells that are not used in a higher layer are detected. A cell descrambling operation is stopped for such unnecessary ATM cells. Thus, since the cell descrambling operation is performed for only necessary cells, the power consumption of the circuit can be decreased.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, an embodiment of the present invention will be described with reference to the accompanying drawings.

Figure 1:
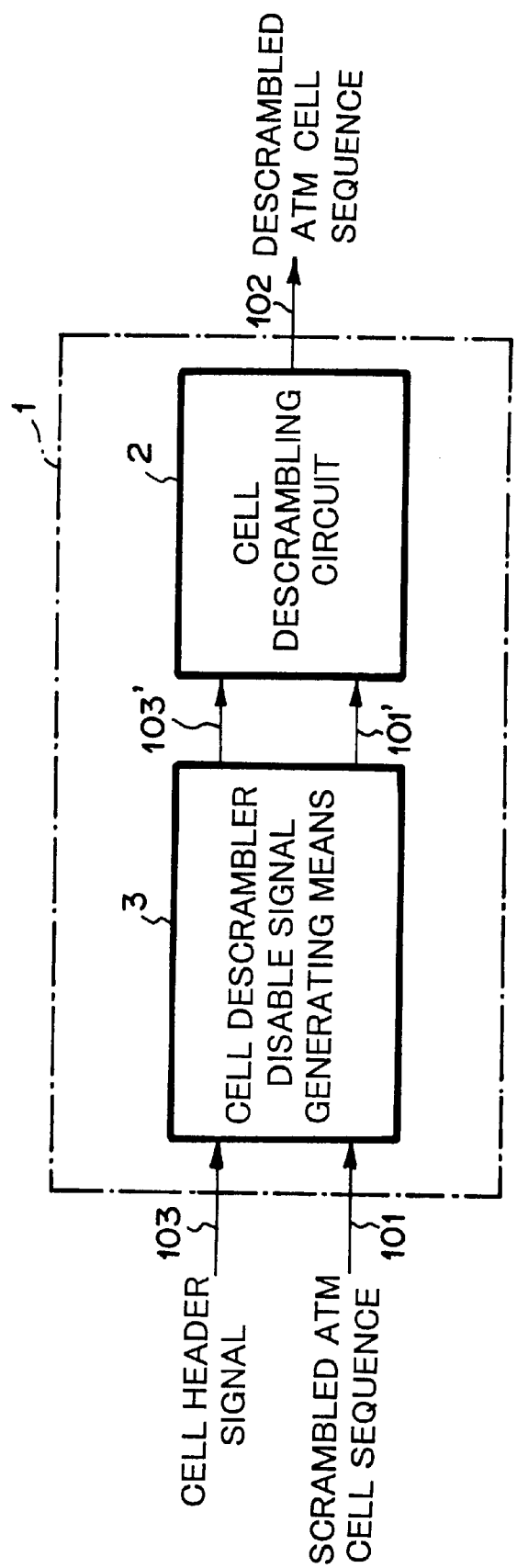
FIG. 1 is a block diagram showing the structure of a cell descrambling circuit according to an embodiment of the present invention.
Figure 5:
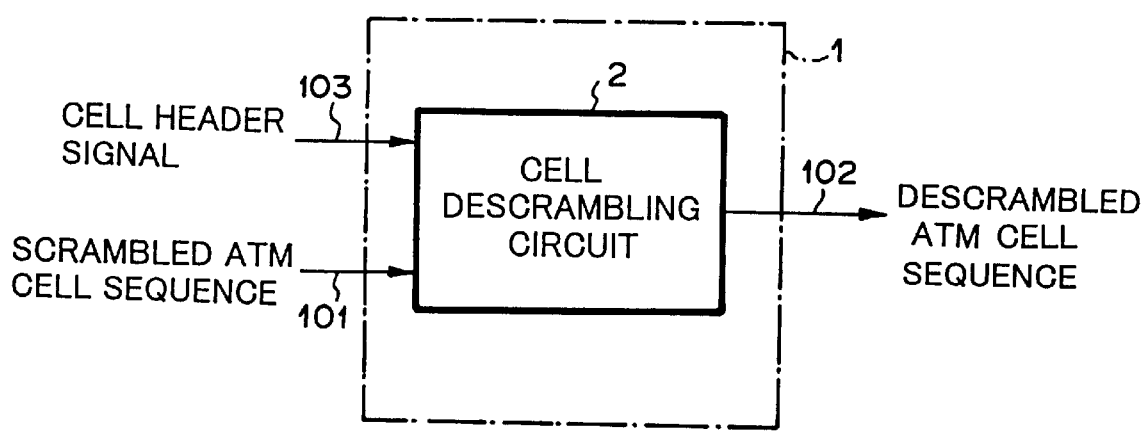
FIG. 5 is a block diagram showing the structure of a conventional cell descrambling circuit.

FIG. 1 is a block diagram showing the structure of a cell descrambling circuit according to an embodiment of the present invention. For simplicity, in FIG. 1, similar portions to those in FIG. 5 are denoted by similar reference numerals and their description is omitted. In FIG. 1, the cell descrambling circuit comprises a cell descrambler disable signal generating means 3 and a cell descrambling circuit 2. The cell descrambler disable signal generating means 3 inputs a scrambled ATM cell sequence 101 and a cell header signal. The cell descrambling circuit 2 inputs cell descrambler input data 101' received from the cell descrambler disable signal generating means 3 and a cell descrambler disable signal 103'. The cell descrambling circuit 2 descrambles an ATM cell sequence that has been scrambled on the transmission side and outputs a descrambled ATM cell sequence.

The difference between the structure shown in FIG. 1 and the structure shown in FIG. 5 is in that the cell descrambler disable signal generating means 3 is disposed in the just upstream stage of the cell descrambling circuit 2. The cell descrambler disable signal generating means 3 generates a signal that causes the cell descrambling circuit to stop its operation for unnecessary ATM cells such as idle cells and unassigned cells that are not used in a higher layer. The operations of the other portions of the structure shown in FIG. 1 are the same as those shown in FIG. 5. The ATM cell scrambling/descrambling operation in the ATM communication apparatus is performed for a payload of each cell in the case that scrambled ATM cells fully or pre-synchronize as defined in various standards. In the standard ANSI T1, 646-1995, when scrambled ATM cells fully or pre-synchronize, a payload portion of which a header portion has been removed from each cell is descrambled by self-synchronizing descrambling method using generating polynomial $X^{43}+1$. An object for scrambling an ATM cell sequence is to prevent the timing of ATM cells from being lost in the case that a sequence of "1s" or "0s" of NRZ takes place. Thus, by scrambling the data, its timing can be effectively maintained.

Figure 3:
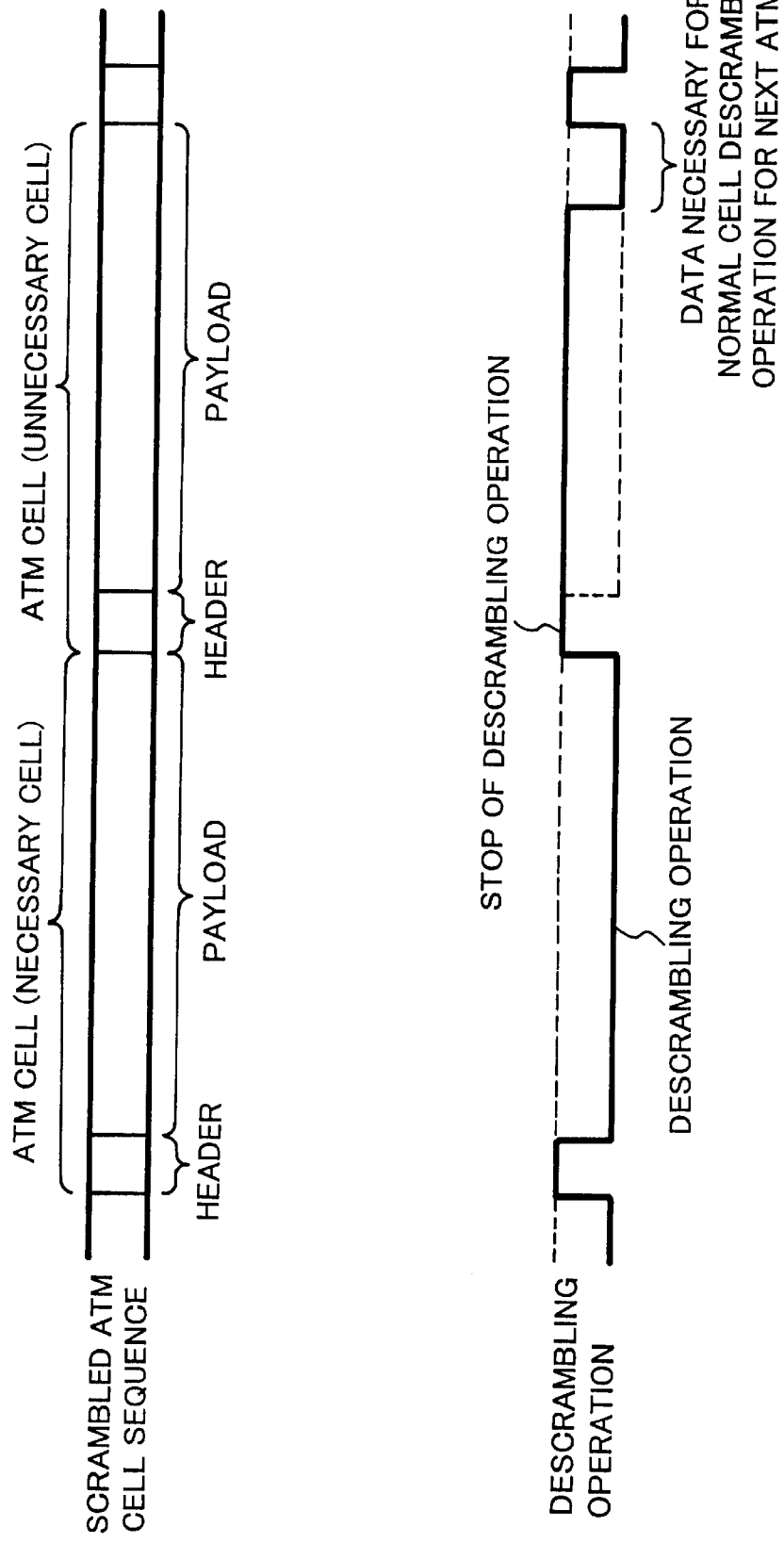
FIG. 3 is a timing chart for explaining the operation of the descrambling circuit according to the embodiment of the present invention.
Figure 6:
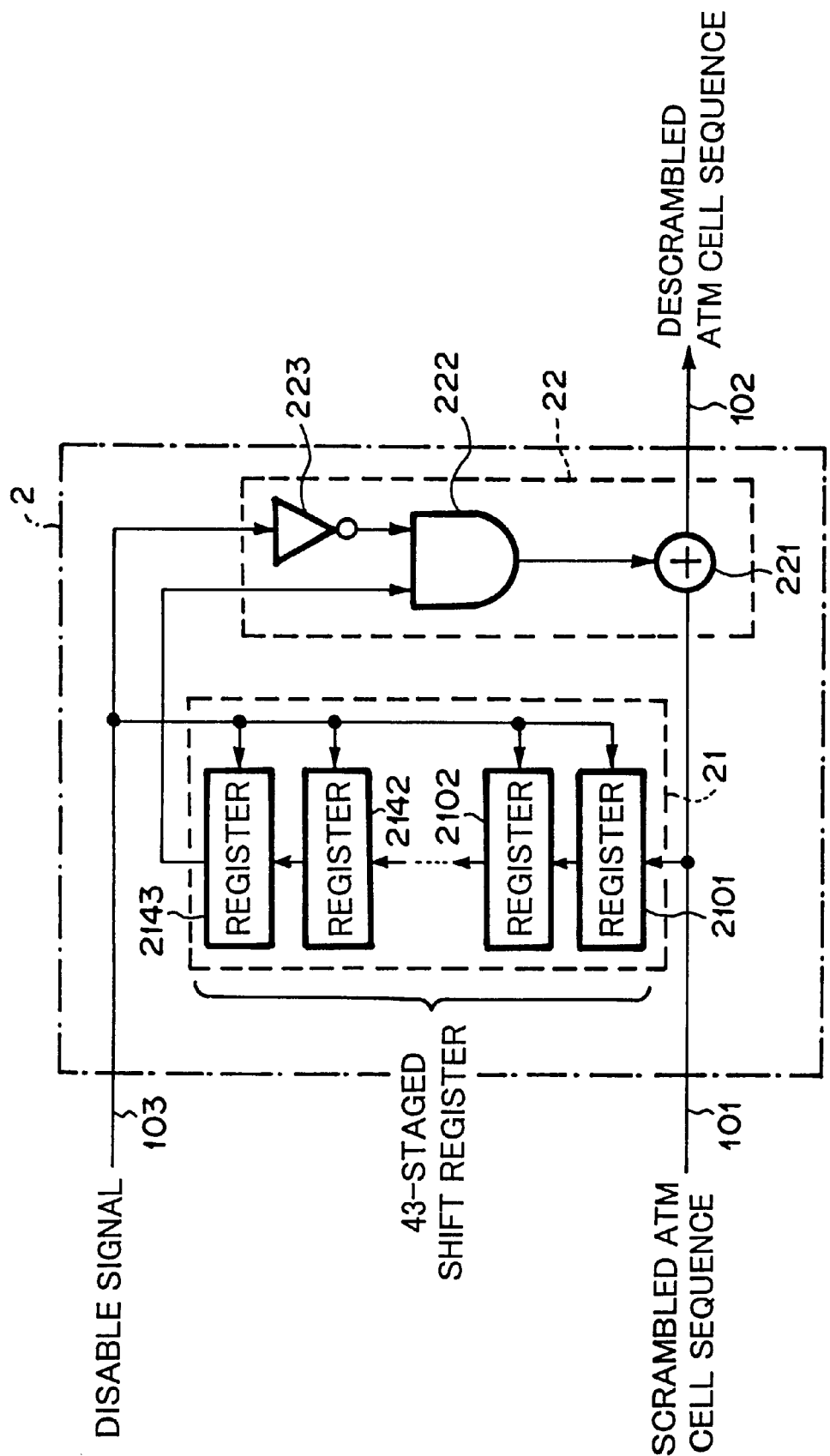
FIG. 6 is a block diagram showing an example of the structure of the cell descrambling circuit 2 shown in FIG. 5.
Figure 7:
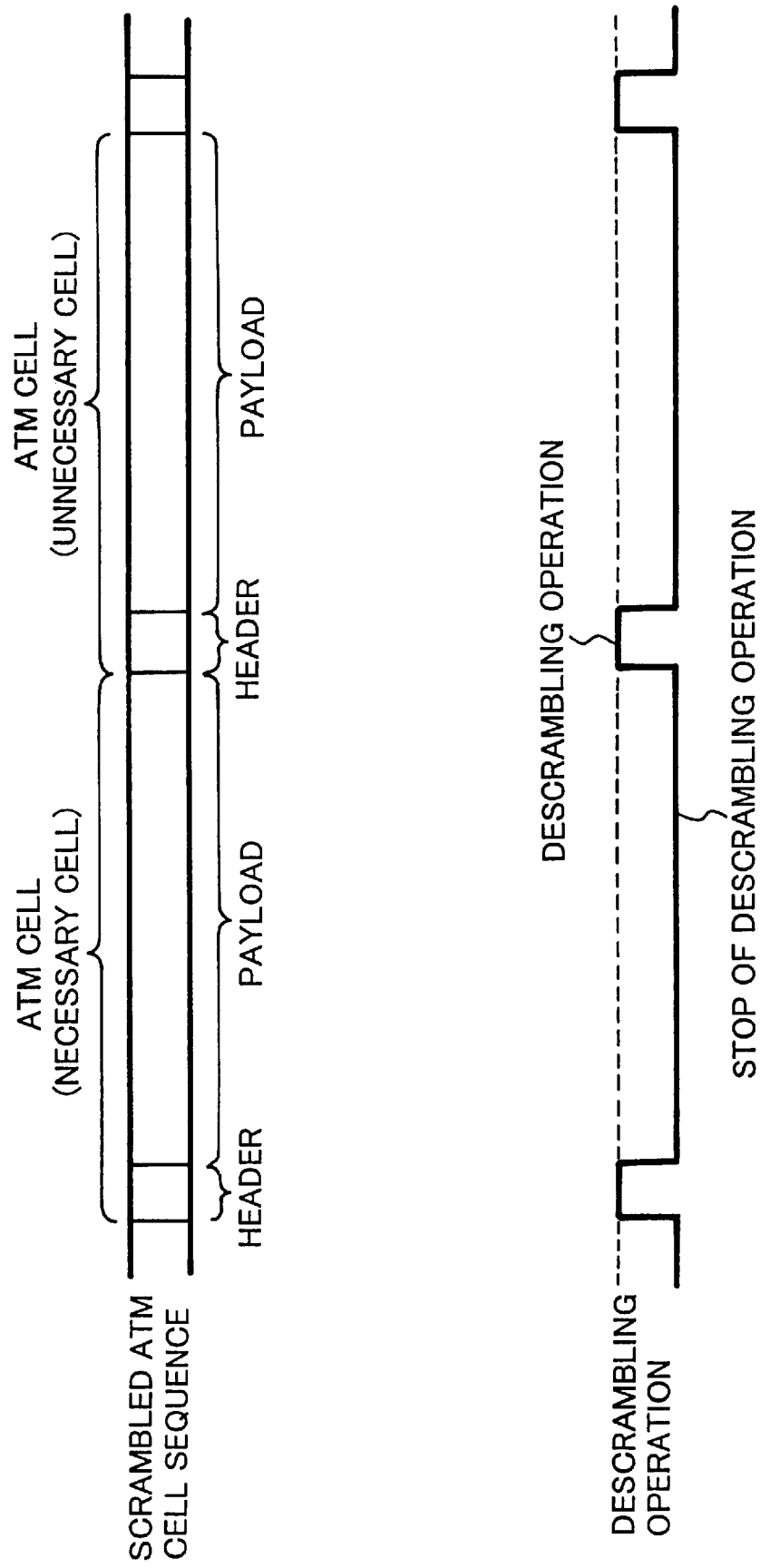
FIG. 7 is a timing chart for explaining the operation of the conventional cell descrambling circuit.

FIG. 3 is a schematic diagram for explaining the relation between a scrambled ATM cell sequence and a descrambling operation performed by the cell descrambling circuit according to the embodiment of the present invention. For simplicity, in FIG. 3, similar portions to those in FIG. 6 are denoted by similar reference numerals. Referring to FIG. 3, a scrambled ATM cell sequence is composed of ATM cells. Each ATM cell is composed of an unscrambled header portion (5 bytes) and a scrambled payload portion (48 bytes) that is a user information region. Thus, the length of each ATM cell is 48 bytes. Normally, the transmission rate of necessary ATM cells do not always match the transmission rate of cells transferred from an ATM layer. To match these transmission rates, idle cells (blank cells) are placed in the ATM cell sequence. As shown in the lower portion of FIG. 3, the descrambling operation is performed only for the payload portion of each necessary ATM cell and a last portion of the payload portion of each unnecessary ATM cell.

The cell descrambler disable signal generating means 3 according to the embodiment shown in FIG. 1 outputs the cell descrambler disable signal that causes the cell descrambling operation to stop for the header portion of each ATM cell. In addition, the cell descrambler disable signal generating means 3 outputs the cell descrambler disable signal that causes the cell scrambling operation to stop for a predetermined period just after the header portion of an unnecessary ATM cell until the beginning of data necessary for the normal cell descrambling operation for the next ATM cell.

In reality, the data necessary for the normal cell descrambling operation for the next ATM cell is data stored in the 43-staged shift register shown in FIG. 6. The cell descrambling circuit exclusive-ORs the data that has been delayed by 43 clock pulses and the current data and outputs the result as descrambled data. Thus, to normally perform the descrambling operation, data prior to 43 clock pulses should have been stored in the 43-staged shift register.

When all ATM cells of the ATM cell sequence are necessary, the descrambling operation may be performed for the payload portion of each ATM cell corresponding to the period defined in the standard. However, when the descrambling operation is performed for unnecessary cells, an excessive power is consumed. In this case, since the 43-staged shift register stores the last 43 bits of a necessary cell followed by at least one unnecessary cell, if the descrambling operation is performed for a payload of a necessary cell just followed by an unnecessary cell, an improper calculation result that is different from that of the related art reference is obtained. To prevent such a problem, the 43-staged shift register stores the last 43 bits of an unnecessary cell just followed by a necessary cell.

Corresponding to the cell descrambler disable signal, the cell scrambling circuit 2 causes the cell descrambling operation to stop for unnecessary ATM cells such as idle cells and unassigned cells that are not used in a higher layer.

Figure 2:
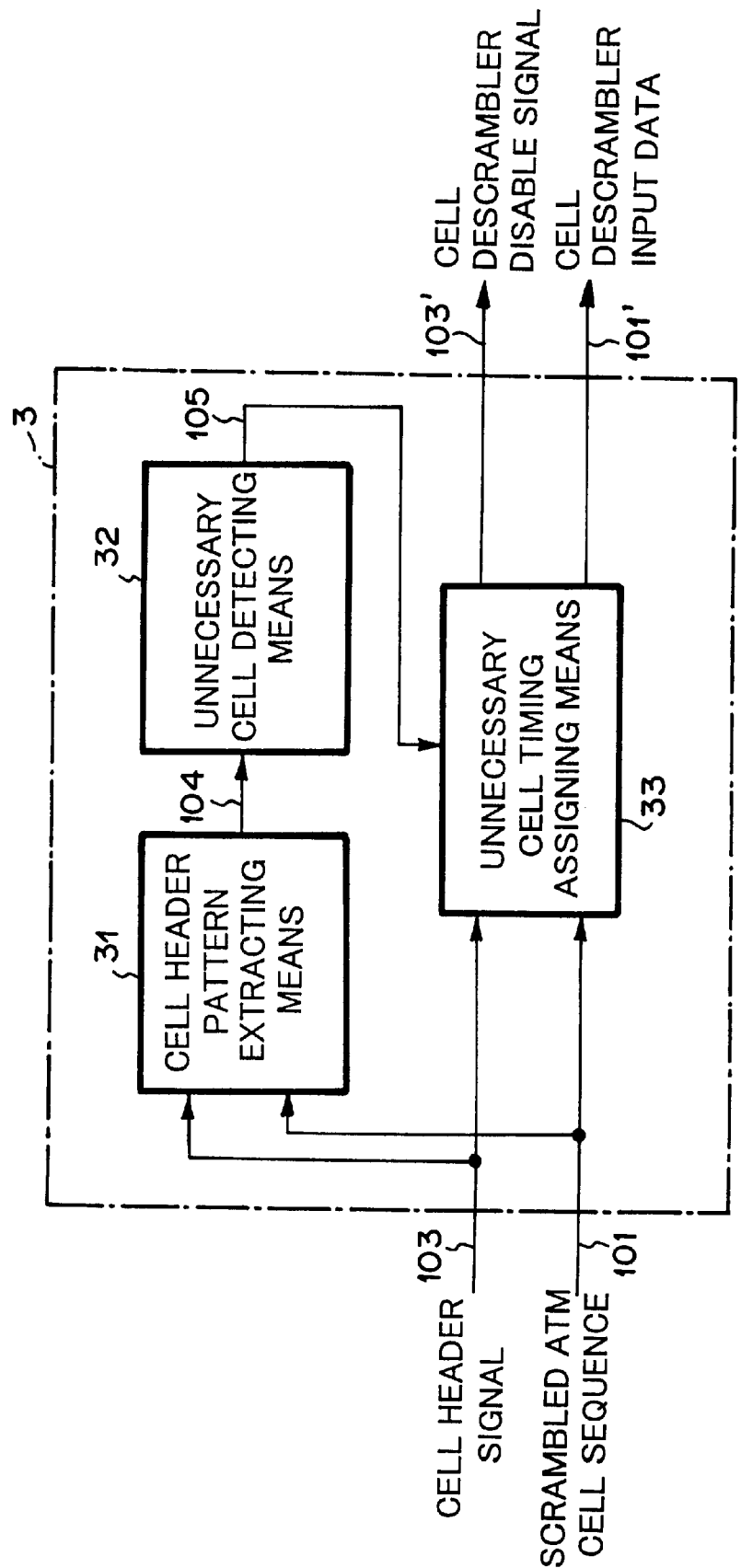
FIG. 2 is a block diagram showing an example of the structure of a cell descrambler disable signal generating means 3 shown in FIG. 1.

FIG. 2 is a block diagram showing an example of the structure of the cell descrambler disable signal generating means 3 according to the embodiment shown in FIG. 1. Referring to FIG. 2, a scrambled ATM cell sequence 101 and a cell header signal 103 that represents a header portion of each ATM cell thereof are input to a cell header pattern extracting means 31. The cell header pattern extracting means 31 extracts a cell header pattern 104 that is 40-bit data from each ATM cell of the scrambled ATM cell sequence 101 and outputs the cell header pattern 104 to an unnecessary cell detecting means 32. The unnecessary cell detecting means 32 compares 40-bit data of the cell header pattern 104 and 40-bit data of a header pattern of a predetermined unnecessary cell and determines whether the current cell is a necessary cell or an unnecessary cell. When the current cell is an unnecessary cell, the unnecessary cell detecting means 32 causes the unnecessary cell detection signal 105 to be active in the period of the unnecessary cell. Examples of unnecessary cells in a higher layer are idle cells and unassigned cells. The cell header patterns of idle cells and unassigned cells are as follows.

Idle cell 40'h 00 00 00 01 52

Unassigned cell 40'h 00 00 00 00 55

Thus, the unnecessary cell detecting means 32 detects only these code sequences and outputs the unnecessary cell detection signal 105. The unnecessary cell detection signal 105, the scrambled ATM cell sequence 101, and the cell header signal 103 are input to an unnecessary cell timing assigning means 33. The unnecessary cell timing assigning means 33 generates a cell descrambler disable signal that causes a cell descrambling circuit downstream thereof to stop in the period of which the descrambling operation is not required for the ATM cell sequence 101 (namely, the period of the header portion of each ATM cell or the period of other than the last 43 bits of a payload of an unnecessary cell. Of course, the ATM cell sequence 101 is delayed for the period necessary for the operations of the cell header pattern extracting means 31, the unnecessary cell detecting means 32, and the unnecessary cell timing assigning means 33. Thus, a cell descramble input data 101' is generated with the same delay period as the cell descrambler disable signal 103'.

The cell descrambler input data 101' and the cell descrambler disable signal 103' are output to the cell descrambling circuit 2 shown in FIG. 1.

Next, with reference to the accompanying drawings, the operation of the descrambling circuit according to the embodiment will be described in detail. The cell header pattern extracting means 31 extracts the cell header pattern 104 from the scrambled ATM cell stream 101 corresponding to the cell header signal 103. The unnecessary cell detecting means 32 determines whether or not the cell header pattern 104 matches an unnecessary ATM cell that is not used in a higher layer. When the cell header pattern 104 matches an unnecessary ATM cell, the unnecessary cell detecting means 32 outputs the unnecessary cell detection signal 105. The unnecessary cell timing assigning means 33 extracts the timing for stopping the cell descrambling operation from the scrambled ATM cell sequence 101 corresponding to the cell header signal 103 and the unnecessary cell detection signal 105 and outputs the extracted timing as the cell descrambler disable signal 103'. In addition, the unnecessary cell timing assigning means 33 outputs the cell descrambler input data 101' that causes the ATM cell sequence 101 to synchronize with the timing signal 103'. The cell descrambling operation is stopped for the period of a header portion and for the period just after a header portion of an unnecessary ATM cell until the beginning of data necessary for the normal cell descrambling operation for the next ATM cell.

Since the cell descrambler disable signal generating means 3 has such a structure, the cell descrambling operation can be stopped for unnecessary ATM cells such as idle cells and unassigned cells. Thus, the power consumption of the circuit can be decreased.

Figure 4:
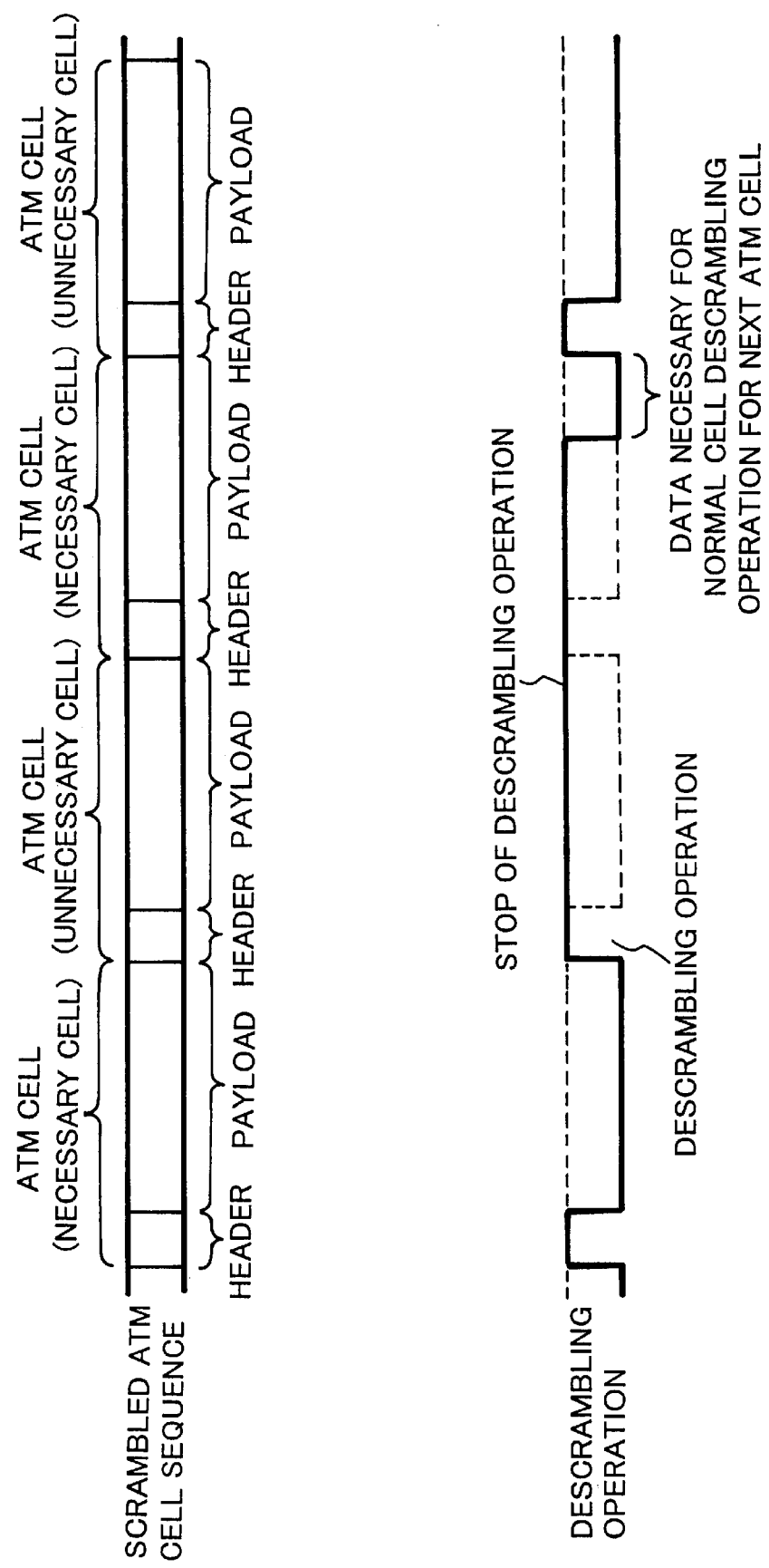
FIG. 4 is a timing circuit for explaining an example of the operation of the cell descrambling circuit according to another embodiment of the present invention.

FIG. 4 is a schematic diagram showing another embodiment of the present invention. In FIG. 4, a scrambled ATM cell sequence is composed of one necessary ATM cell, two unnecessary ATM cells (such as blank cells), and several necessary ATM cells. In the scrambled ATM cell sequence, the descrambling operation is performed for the payload portion of each necessary ATM cell and a last portion of the payload portion of an unnecessary ATM cell just followed by a necessary ATM cell. Thus, a descrambled signal as a demodulated signal is output.

The descrambling operation shown in FIG. 4 is different from the descrambling operation shown in FIG. 3 in whether or not the cell descrambling operation is stopped for other than the last cell of successive unnecessary ATM cells. Since the cell descrambler disable signal generating means 3 shown in FIG. 1 controls the cell descrambling operation in such a manner, the descrambling operation in FIG. 4 can be stopped for a larger region than the descrambling operation shown in FIG. 3. Thus, the power consumption can be further decreased.

According to the present invention, unnecessary ATM cells such as idle cells and unassigned cells that are not used in a higher layer are detected. For the detected unnecessary ATM cells, the cell descrambling operation is stopped for a predetermined period. Thus, necessary cells are normally descrambled and unnecessary cells are successively transmitted in the state that they have been scrambled. Since the unnecessary cells are clearly distinguished and the descrambling operation thereof are stopped, the power consumption of the circuit can be decreased.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An asynchronous transfer mode (ATM) cell descrambling circuit for detecting a header portion and a payload portion of each cell of a scrambled ATM cell sequence in the state that each cell pre- or fully-synchronizes, descrambling the payload portion, and outputting a descrambled ATM cell sequence, the circuit comprising:

means for determining whether each ATM cell comprises an unnecessary ATM cell that is not used in a higher layer of an ATM communication so as to stop a cell descrambling operation for a predetermined period, wherein said unnecessary cell comprises one of an idle cell and an unassigned cell, wherein said descrambling operation is performed for a payload portion of each necessary ATM cell and a last portion of a payload portion of each said unnecessary ATM cell, and wherein said determining means generates input data for said cell descrambling operation and generates a signal for stopping said cell descrambling operation, said input data and said signal both having a same delay period.

2. The ATM cell descrambling circuit as set forth in claim 1, wherein the predetermined period comprises a period just after the header portion of an unnecessary ATM cell until the beginning of data necessary for the normal ATM cell descrambling operation for the next ATM cell.

3. The ATM cell descrambling circuit as set forth in claim 1, wherein when unnecessary ATM cells successively take place, the predetermined period comprises a period just after the header portion of the first unnecessary ATM cell until the beginning of data necessary for the normal ATM cell descrambling operation for a necessary ATM cell just preceded by the last unnecessary ATM cell.

4. The ATM cell descrambling circuit set forth in claim 1, wherein said unnecessary cells are successively transmitted in a scrambled state.

5. An asynchronous transfer mode (ATM) cell descrambling circuit for detecting a header portion and a payload portion of each cell of a scrambled ATM cell sequence in the state that each cell pre- or fully-synchronized, descrambling the payload portion, and outputting a descrambled ATM cell sequence, the circuit comprising:

cell header pattern extracting means for inputting the scrambled ATM cell sequence and a cell header signal;

unnecessary cell detecting means for inputting a cell header pattern extracted by said cell header pattern extracting means and outputting an unnecessary cell detection signal;

unnecessary cell timing assigning means for inputting the cell header signal and the scrambled ATM cell sequence and outputting a cell descrambler disable signal and a cell scrambler input data corresponding to the unnecessary cell detection signal; and a cell descrambler circuit for descrambling the cell descrambler input data corresponding to the cell descrambler disable signal, wherein said unnecessary cell comprises one of an idle cell and an unassigned cell, wherein a descrambling operation is performed for a payload portion of each necessary ATM cell and a last portion of a payload portion of each said unnecessary ATM cell, and wherein said cell descrambler disable signal and said cell scrambler input data have a same delay period.

6. The ATM cell descrambling circuit set forth in claim 5, wherein the predetermined period comprises a period just after the header portion of an unnecessary ATM cell until the beginning of data necessary for the normal ATM cell descrambling operation for the next ATM cell.

7. The ATM cell descrambling circuit as set forth in claim 5, wherein when unnecessary ATM cells successively take place, the predetermined period comprises a period just after the header portion of the first unnecessary ATM cell until the beginning of data necessary for the normal ATM cell descrambling operation for a necessary ATM cell just preceded by the last unnecessary ATM cell.

8. The ATM cell descrambling circuit set forth in claim 5, wherein said unnecessary cells are successively transmitted in a scrambled state.

9. An asynchronous transfer mode (ATM) cell descrambling circuit comprising:

a detector for detecting a header portion and a payload portion of each cell of a scrambled ATM cell sequence in the state of a cell pre-synchronize state and a fully-synchronize state;

a descrambler for descrambling the payload portion; and means for outputting a descrambled ATM cell sequence, wherein said detector determines whether each ATM cell comprises an unnecessary ATM cell that is not used in a higher layer of an ATM communication, wherein said descrambler stops the cell descrambling operation for a predetermined period, wherein said unnecessary cell comprises one of an idle cell and an unassigned cell, wherein said cell descrambling operation is performed for a payload portion of each necessary ATM cell and a last portion of a payload portion of each said unnecessary ATM cell, and wherein said outputting means generates input data for said descrambler and a descrambler disabling signal with a same delay period.

10. The ATM cell descrambling circuit as set forth in claim 9, wherein the predetermined period comprises a period just after the header portion of an unnecessary ATM cell until the beginning of data necessary for the normal ATM cell descrambling operation for the next ATM cell.

11. The ATM cell descrambling circuit as set forth in claim 9, wherein when unnecessary ATM cells successively take place, the predetermined period comprises a period just after the header portion of the first unnecessary ATM cell until the beginning of data necessary for the normal ATM cell descrambling operation for a necessary ATM cell just preceded by the last unnecessary ATM cell.

\* \* \* \* \*